United States Patent [19]

Shimano

[11] Patent Number: 4,829,584
[45] Date of Patent: May 9, 1989

[54] IMAGE INPUT SYSTEM

[75] Inventor: Noriyuki Shimano, Uji, Japan

[73] Assignee: Dainippon Screen Mfg. Co., Ltd., Kyoto, Japan

[21] Appl. No.: 840,999

[22] Filed: Mar. 17, 1986

[30] Foreign Application Priority Data

Mar. 26, 1985 [JP] Japan ................................. 60-62684
Mar. 26, 1985 [JP] Japan ................................. 60-62685

[51] Int. Cl.⁴ .............................................. G06K 9/00
[52] U.S. Cl. ...................................... 382/41; 382/50; 341/95
[58] Field of Search .................... 382/41, 50; 358/214, 358/166, 284, 80; 340/347 DD

[56] References Cited

U.S. PATENT DOCUMENTS

| | | | |
|---|---|---|---|
| 3,800,078 | 3/1974 | Cochran et al. | 382/50 |
| 3,988,602 | 10/1976 | Gorsica, Jr. | 358/214 |
| 4,346,402 | 8/1982 | Pugsley | 358/80 |
| 4,365,304 | 12/1982 | Ruhman et al. | 382/41 |
| 4,387,428 | 6/1983 | Ishida et al. | 364/414 |
| 4,491,961 | 1/1985 | Sutton et al. | 382/41 |
| 4,493,106 | 1/1985 | Farhangi et al. | 382/41 |
| 4,584,606 | 4/1986 | Nagasaki | 358/209 |
| 4,667,245 | 5/1987 | Matsumoto | 358/213.13 |
| 4,697,236 | 9/1987 | Butts et al. | 356/39 |
| 4,700,236 | 10/1987 | Abe | 358/284 |

Primary Examiner—Leo H. Boudreau
Attorney, Agent, or Firm—Lowe, Price, LeBlanc, Becker & Shur

[57] ABSTRACT

Optical image data read by a photoelectric converter are converted into N-bit digital signals through A-D converter, which are inputted in a look-up table memory as address data. The memory stores M-bit digital data which are linearly dependent on optical density of the image. Thus, the N-bit digital signals are transformed to the M-bits digital signals and a reproduced image obtained as an output of the memory has a optical density which is corresponding to that of the original image.

16 Claims, 6 Drawing Sheets

| ADDRESS(N-BIT) | DATA(M-BIT) |
|---|---|
| $X_1$ | $f(X_1)$ |
| $X_2$ | $f(X_2)$ |
| $X_3$ | $f(X_3)$ |
| $X_4$ | $f(X_4)$ |

IMAGE INPUT SYSTEM

BACKGROUND OF THE INVENTION

Field of the Invention

The present invention relates to an image input system, and more particularly, it relates to an image input system which optically reads an image of an object and converts the same into digital signals to be supplied to an image processing system. Description of the Prior Art In an image input system used as a front stage of an image processing system such as a facsimile or a process scanner, an image is generally photoelectrically read by a photoelectric converter such as a photomultiplier, an optical diode or a charge coupled device (CCD). However, as is well known in the art, intensity of light incident upon the photoelectric converter from the original image is expressed by an exponential function of optical density D of the image, and hence the levels of analog electric signals outputted from the photoelectric converter are also expressed by the exponential functions of the optical density D, and the signals are not proportional to the optical density of the image. Therefore, the analog output signals from the photoelectric converter have generally been logarithmically transformed by means of such as an analog operational amplifier to obtain output signals which are in linear relation to the optical density of the original image, in order to simplify the processing in the image processing system and to improve gradation reproducibility. A circuit employing such an analog operational amplifier is relatively simple in construction, because it can be formed by one operational amplifier and a diode when an operational amplifier (so-called LOG amplifier) performing the said logarithmic transformation is utilized.

However, an analog operational amplifier formed by a semiconductor integrated circuit is inferior in frequency response and is not appropriate to high-speed processing. Further, the characteristics of the operational amplifier are generally unstable by temperature drift etc., and hence the gradation cannot be correctly reproduced. In addition, such a circuit employing the analog element cannot be easily adjusted, leading to inferior productivity.

SUMMARY OF THE INVENTION

The present invention is directed to an image input system which photoelectrically reads the image of an object to supply signals expressing the image to an image processing system.

The image input system according to the present invention comprises a photoelectric conversion means for photoelectrically reading the image to convert the same into electric analog signals, an analog-to-digital converter means for converting the analog signals into N-bit digital signals and a digital data transformation means for transforming the N-bit digital signals to M-bit digital signals which have a prescribed linear relation to optical density of the image to supply the M-bit digital signals to the image processing system, where N and M are integers satisfying N>M.

The image read by the photoelectric conversion means is temporarily converted into N-bit digital signals, which in turn are transformed to M-bit digital signals by the digital data transformation means. The N-bit digital signals are nonlinear to the optical density of the inputted image, while the M-bit digital signals are linear to the optical density of the original image. Since such transformation is performed on the digital signals, a high speed processing and a stabilization of transformation characteristics are obtained.

According to an aspect of the present invention, the linear relation to the optical density is optionally varied. Such image input system further comprises a transformation characteristic specifying means for inputting linear relation specifying data for specifying the desired linear relation within variable linear relation to supply transformation characteristics corresponding to the desired linear relation to the digital transformation means.

Thus, an optimum linear relation is selected in response to the optical density range of the inputted image and the N-bit digital signals are transformed into the M-bit digital signals in the optimum linear relation to the optical density.

Accordingly, an object of the present invention is to provide an image input system having stable and highly improved gradation reproducibility.

Another object of the present invention is to provide an image input system which can perform high-speed processing.

Still another object of the present invention is to provide an image input system which is excellent in productivity.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
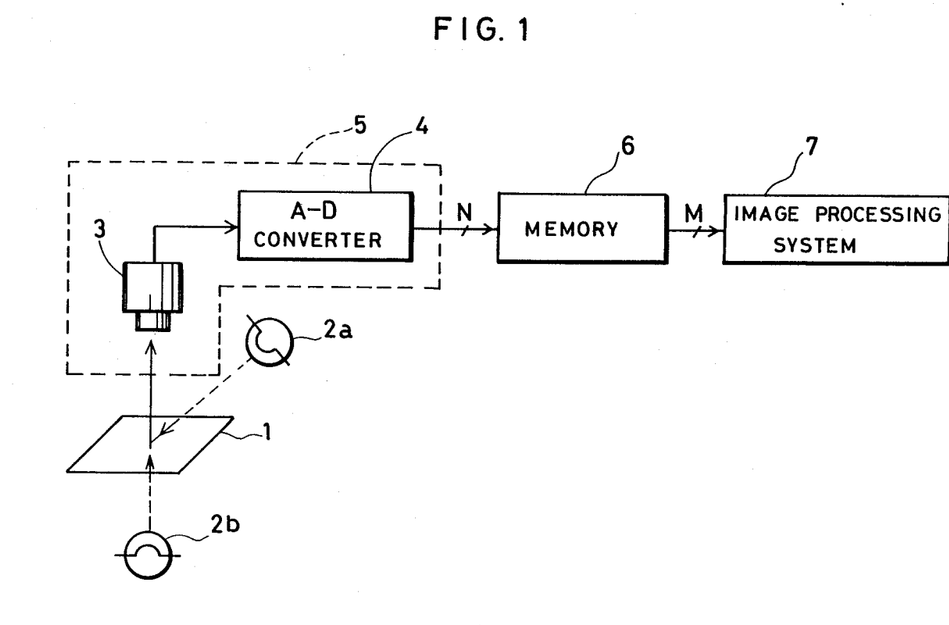
FIG. 1 is a block diagram showing a first embodiment of the present invention.

FIG. 1 shows structure of an image input system according to a first embodiment of the present invention. In FIG. 1, reading light is emitted from a reflection light source 2a or a transmission light source 2b on an original 1 to be inputted, which is recorded with an image having gradation. The light reflected by or transmitted through the original 1 is incident upon a photoelectric converter 3 included in the image input system through a well-known optical system (not shown). The image is sequentially inputted along the scanning direction of a well-known scanning mechanism (not shown) per fine pixel of the original 1.

Image data of the object (the original 1) thus optically inputted in the system are converted into analog electric signals by the photoelectric converter 3, to be further converter into N-bit digital signals (N=integer) in an A-D converter 4 in a subsequent stage, through an appropriate amplifier (not shown). For convenience of illustration, the photoelectric converter 3 and the A-D converter 4 are coupled to be hereinafter referred to as an "input/conversion section 5".

The N-bit digital signals outputted from the input/conversion section 5 serve as address signals for a semiconductor memory 6 provided in a subsequent stage. In each address of the memory 6, M-bit digital data (M=integer smaller than N) obtained by an operation on the basis of prescribed expressions is previously stored as hereinafter described in detail. The M-bit digital signals corresponding to the M-bit digital data are outputted from addresses designated by the inputted N-bit digital signals, to be supplied to an image processing system 7.

Figure 2:
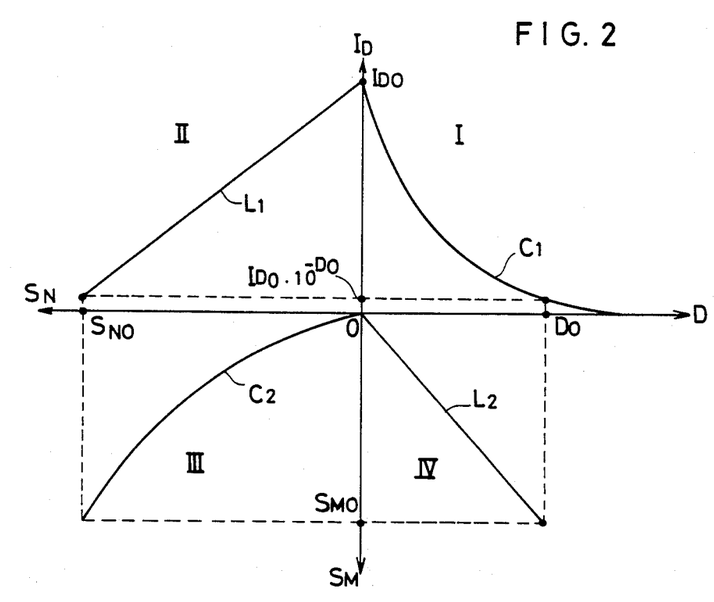
FIGS. 2 and 5 are graphs showing characteristics of the first embodiment.

Description is now made of an input/conversion characteristics of the input/conversion section 5, with reference to FIG. 2. In the graph as shown in FIG. 2, the first quadrant I shows a relation between the optical density D of the inputted image and outputs $I_D$ from the photoelectric converter 3. An hereinabove described, the analog outputs from the photoelectric converter 3 are expressed as exponential functions of the optical density D, which can be expressed as follows, considering the amplifying gain in case that the outputs from the photoelectric converter element 3 are amplified by an analog linear amplifier (not shown):

$$I_D = I_{D0} \cdot 10^{-D} \quad (1)$$

where the original optical density is assumed to be within the range of $0 \leq D \leq D_0$, and $D_0$ represents the maximum value of the reproducible optical density and $I_{D0}$ represents the value $I_D$ in case of D=0. This functional form is depicted by a curve identified by a symbol $C_1$ in FIG. 2.

On the other hand, the second quadrant II in FIG. 2 shows a relation between outputs $I_D$ from the photoelectric converter 3 and outputs $S_N$ from the A-D converter 4, i.e., input/output characteristics of the A-D converter 4. The outputs $S_N$ are supplied as the N-bit signals, as hereinabove described. It is well known in the art that A-D conversion characteristics of the A-D converter 4 are substantially linear, and can be expressed by a straight line $L_1$ as shown in FIG. 2. The functional form of the straight line $L_1$ can be obtained from the following conditions, assuming that $S_{N0}$ represents the output value $S_N$ corresponding to the aforementioned maximum value $D_0$:

(i) where $I_D = I_{D0}$ (i.e., D=0), $S_N = 0$; and
(ii) where $I_D = I_{D0} 10^{-D_0}$ (i.e., $D=D_0$), $S_N = S_{N0}$ and the result is as follows:

$$S_N = \frac{S_{N0}}{1 - 10^{-D_0}} \left(1 - \frac{I_D}{I_{D0}}\right) \quad (2)$$

Eliminating $I_D$ in the expression (2) by the expression (1), following expression (3) is obtained.

$$S_N = S_{N0} \frac{1 - 10^{-D}}{1 - 10^{-D_0}} \quad (3)$$

As obvious from the expression (3), the N-bit digital signals after the A-D conversion are also nonlinear with respect to the optical density D.

Figure 3:
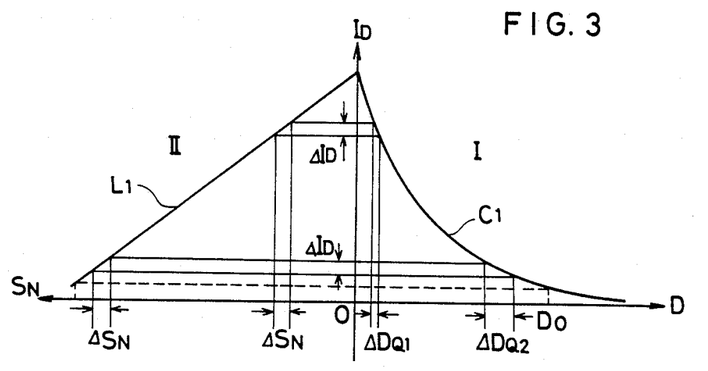
FIG. 3 is a graph showing characteristics of a reference example.

For reference, now consider such case where the outputs from the input/conversion section 5 are directly supplied to the image processing system 7. In this case assuming that quantization errors in the N-bit digital signals $S_N$ are represented by $\Delta S_N$ as shown in FIG. 3, a density error $\Delta D_{Q1}$ corresponding to the quantization error $\Delta S_N$ in a low-density region is relatively small, whereas a density error $\Delta D_{Q2}$ in a high-density region is considerably larger. Therefore, if the data length (i.e., N) of the N-bit digital signals is decreased, the optical density and the gradation are deteriorated in reproductibility in the high-density region. Thus, the gradation is caused to jump and accurate reproduction of fine gradation cannot be obtained.

On the other hand, when the data length N is increased to improve gradation reproducibility in the high-density region, the cost of the image processing system would increase in proportion to N and this improvement would be impractical. Thus, when the outputs from the input/conversion section 5 as shown in FIG. 2 are directly supplied to the image processing system 7, problems are cuased in the relation between the gradation reproductibility and the cost.

According to the present invention, therefore, a digital data transformation means (memory 6) is provided in order that the gradation reproductibility in the input/conversion section 5 may be obtained by performing processing with relatively large data length and that the image processing system 7 may perform processing with smaller data length while maintaining the good reproductibility. The memory 6 serving as the digital data transformation means is adapted to transform the N-bit digital signals received in the same into M-bit digital signals (N>M) indicating values $S_M$ in a prescribed linear relation to the optical density D, as shown by a functional form $L_2$ in the fourth quadrant IV of FIG. 2. Thus, the values $S_M$ to be outputted may be data in the following relation to the optical density D:

$$S_M = S_{M0} \left(\frac{D}{D_0}\right) \quad (4)$$

where $S_{M0}$ represents the maximum value of the outputs $S_M$ corresponding to $D=D_0$.

Since inputs $S_N$ in the memory 6 are given by the expression (3) and the outputs $S_M$ therefrom must be given by the expression (4), the transformation through the memory 6 must be performed on the basis of the following transformation relation (5), which is obtained by eliminating the value D from the expressions (3) and (4):

$$S_M = \frac{S_{M0}}{D_0} \log\left\{\frac{S_{N0}}{S_{N0} - S_N(1 - 10^{-D_0})}\right\} \quad (5)$$

This functional relation is shown by $C_2$ in the third quadrant III in FIG. 2.

Therefore, assuming that the right side of the expression (5) is expressed as $f(S_N)$ as the function of the inputs $S_N$, the memory 6 may be so structured as to output the functional value $f(S_N)$ upon receiving the inputs $S_N$. In order to achieve such transformation, M-bits values $f(x_1), f(x_2), \ldots$ previously calculated on the basis of the expression (5) are stored in addresses (N - bit) respectively corresponding to all possible values $x_1, x_2, \ldots$ of the inputs $S_N$ in this embodiment. Then the value $S_M$ stored in the address designated by the received signal $S_N$ is read out and is outputted to the image processing system. This is an application of the so-called look-up table memory.

Figure 5:
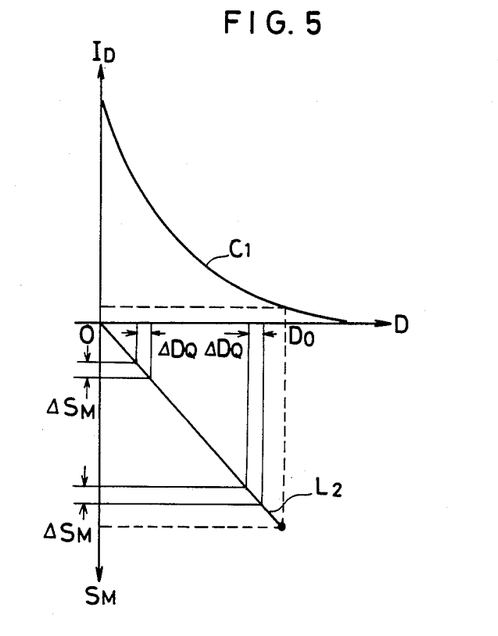

In such system, as shown in FIG. 5 the quantization errors $\Delta S_M$ in the M-bit digital signals $S_M$ correspond to a prescribed density error $\Delta D_Q$ in respective regions of the optical density D. Therefore, even if the value M employed is relatively small, sufficient gradation reproducibility is insured even in high-density regions.

For example, in case of N=12 bits, M=8 bits and $D_0$=2.0, the density error $\Delta D_Q$ in this embodiment is obtained as 0.008 (independent of D) on the basis of the expression (4). On the other hand, when memory 6 is not provided and the N-bit outputs from the input/conversion section 5 are directly supplied to the image processing system 7, the density error corresponding to sections of $S_N$=254 to 255 is 0.143, assuming that N=8 bits. Thus, the gradation reproducibility is remarkably improved in this embodiment. Further, the employment of a look-up table memory enables high-speed operation while productivity and stability are improved through the digital processing.

Second Embodiment

Figure 6:
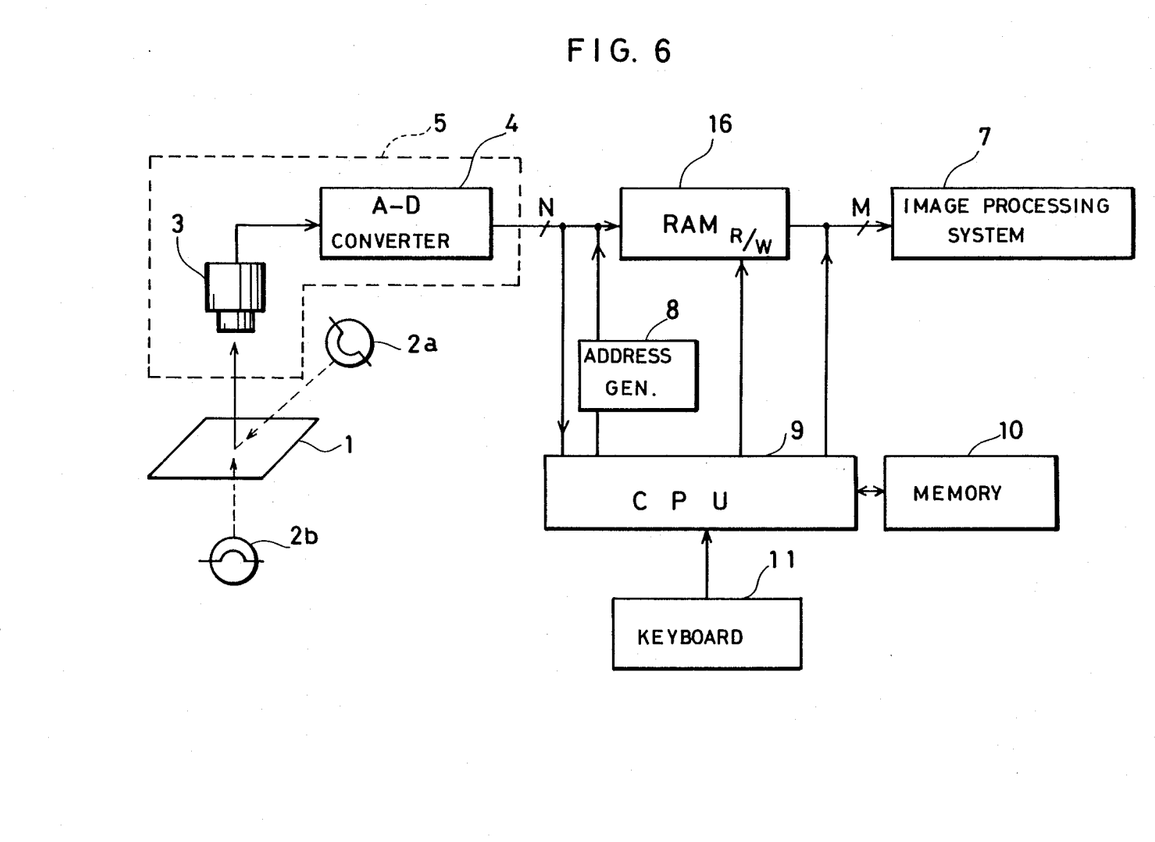
FIG. 6 is a block diagram showing a second embodiment of the present invention.

Referring now to FIG. 6, description is made of a second embodiment of the present invention. The system as shown in FIG. 6 is different from that of FIG. 1 in the following points: First, the memory 6 as shown in FIG. 1 is replaced by a RAM 16, so as to enable reloading of a look-up table stored therein. Further, the system as shown in FIG. 6 includes a CPU 9 which operates to give data required for transforming N-bit digital signals into M-bit digital signals in response to a program stored in memory 10 and data (linear relation specifying data) inputted through a keyboard 11 as hereinafter described in detail. The data thus obtained are previously stored in addresses of the RAM 16 designated by outputs from an address generator 8.

Figure 7:
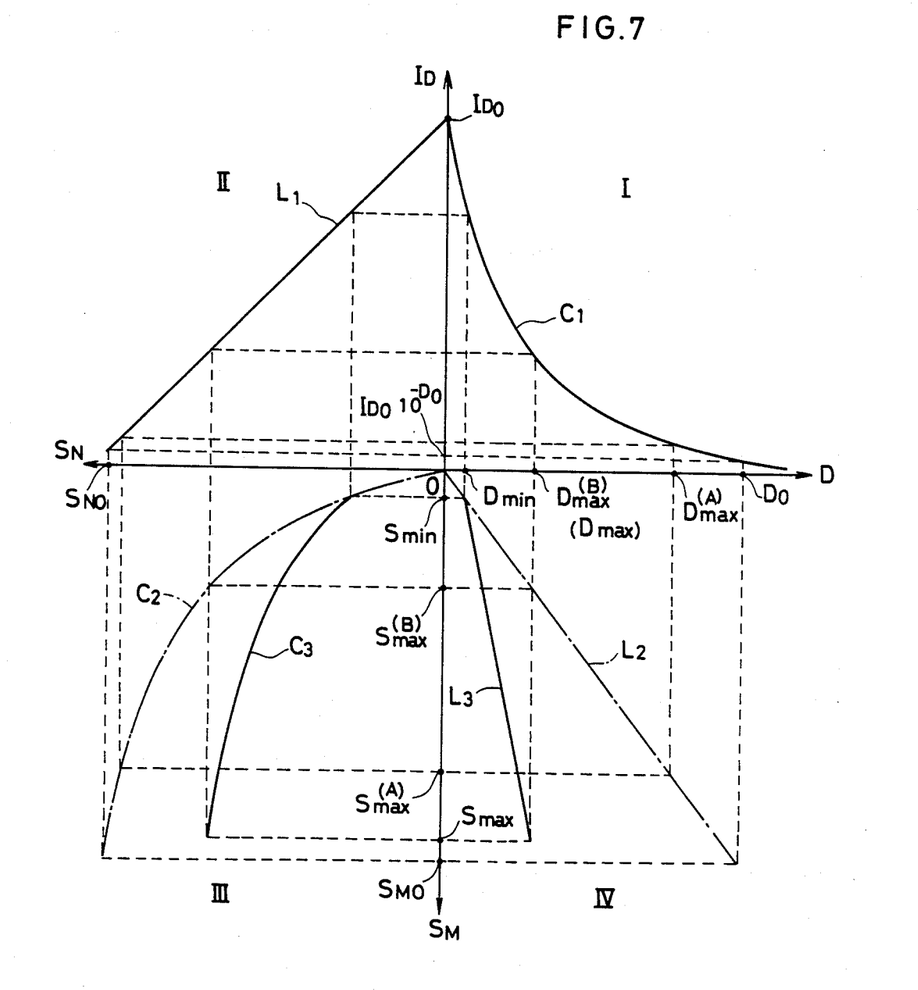
FIG. 7 is a graph showing characteristics of the second embodiment.

In order to clarify features of the second embodiment, discussion is now made on properties of the first embodiment from another point of view. When the optical density range of the image to be inputted, i.e., the range over high light portions and shadow portions of the original is relatively wide as $D_{min} \leq D \leq D_{max}^{(A)}$ as shown at FIG. 7, substantially no problem is caused since the data range of the M-bit digital data $S_M$ corresponding to the said optical density range is also wide as $S_{min} \leq S_M \leq S_{max}^{(A)}$ as shown at FIG. 7. However, when the optical density range of the original image is narrow as $D_{min} \leq D \leq D_{max}^{(B)}$ as shown at FIG. 7, the data range of the M-bit digital data $S_M$ is inevitably narrowed as $S_{min} \leq S_M \leq S_{max}^{(B)}$ as shown at FIG. 7. Therefore, the M-bit digital data $S_M$ are only partially utilized although the same have the wide data range of $0 \leq S_M \leq S_{M0}$. For example, even if 8-bit digital data are prepared for $S_M$, gradation of the original image is merely expressed by a part of the $2^8=256$ gradation levels. Thus, even if such data are transformed anew through a linear table, no clear reproduced image can be obtained due to jumps etc. caused in the gradation.

With respect to the image in the narrow density range of $D_{min} \leq D \leq D_{max}^{(B)}$, therefore, it is preferable to use such linear relation that the density range corresponds to most parts of the range of the M-bit digital data $S_M$ as shown by $L_3$ in FIG. 7. However, if the RAM 16 fixedly stores such transformation data based on the linear relation $L_3$, originals in wider density ranges cannot be treated. Thus, the system is so constructed that the linear relation can be varied to enable appropriate selection.

In other words, the linear relation $L_3$ is considered in such a manner that the end points $(D_{max}, S_{max})$ and $(D_{min}, S_{min})$ thereof are variable. Then, data of these end points are arbitarily inputted through the keyboard 11 as shown in FIG. 6 as "linear relation specifying data" to fetch respective values $S_N$ corresponding to $D_{max}$ and $D_{min}$. On the basis of this process, the CPU 9 operates to obtain transformation data based on a linear functional form passing through the two end points. An expression for giving the transformation data is obtained in the following manner:

The expressions (1) to (3) obtained on the basis of the functional forms $C_1$ and $L_1$ in FIG. 2 are also valid in the second embodiment. An alternative expression corresponding to the expression (4) is an equation for a straight line passing through the aforementioned two end points, which is formularized as follows:

$$(S_M - S_{min})(D_{max} - D_{min}) = (S_{max} - S_{min})(D - D_{min}) \qquad (6)$$

The value D is eliminated from the expressions (3) and (6), to obtain the following expression:

$$S_M = \frac{1}{\Delta D} \left[ \Delta(SD) + \Delta S \log \left( \frac{S_{N0}}{S_{N0} - S_N(1 - 10^{-D_0})} \right) \right] \qquad (7)$$

where $$\Delta D = D_{max} - D_{min} \qquad (8)$$

$$\Delta S = S_{max} - S_{min} \qquad (9)$$

$$\Delta(SD) = S_{min} D_{max} - S_{max} D_{min} \qquad (10)$$

Symbol $C_3$ in FIG. 7 shows the functional form represented by the expression (7). Thus, the variable transformation relation represented by the expression (7) may be properly specified by specifying the values $D_{min}$, $D_{max}$, $S_{min}$ and $S_{max}$ according to the conditions of original 1 to perform transformation corresponding thereto. Thus, within the required range, the amount of change of $S_M$ with respect to constant change in the optical density is always constant to prevent jumps etc. of gradation.

Figure 8:
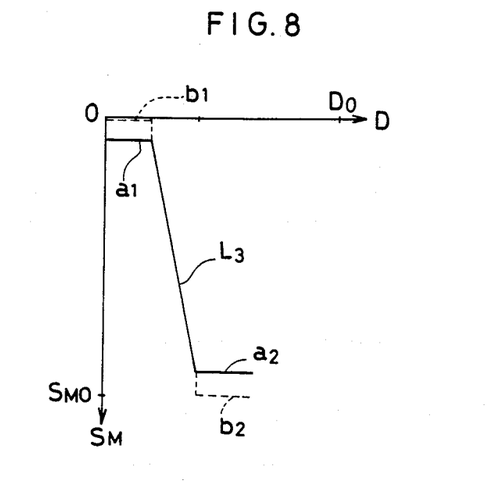
FIG. 8 is a graph showing a treatment in the vicinity of maximum and minimum values of the optical density in the second embodiment.

In this case, however, there remain problems in transformation in the ranges of vicinity of the respective ones of the maximum and minimum values, i.e, $0 \leq D \leq D_{min}$ and $D_{max} \leq D \leq D_0$. Such problems may be solved by connecting the linear relation to "limit transformation" as shown at $a_1$ and $a_2$ or "boost-up transformation" as shown at $b_1$ and $b_2$ in FIG. 8. The transformation $a_1$ is appropriate as the printing characteristic for letterpress printing and the transformation $b_1$ as that for offset printing.

On the basis of the above discussion, description is now made on the operation of the embodiment as shown in FIG. 6 within a range not overlapping with the above description.

First, a program for operating the expression (7) is stored in the memory 10 with the parameters $D_{min}$, $D_{max}$, $S_{min}$ and $S_{max}$. An operator inputs the optical density range of the original 1 to be inputted and the data range of the data $S_M$ to be outputted in correspondence to the optical density range as the end point values $D_{min}$, $D_{max}$, $S_{min}$ and $S_{max}$, through the keyboard 11.

Figure 4:
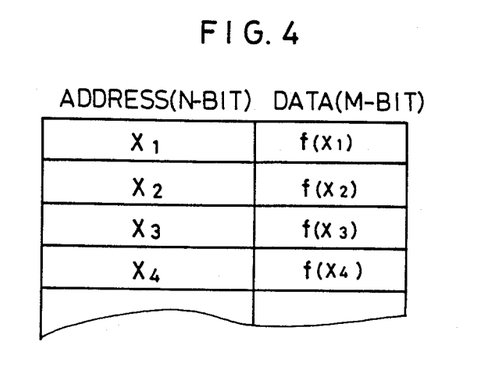
FIG. 4 illustrates data storage format of a memory employed in the first embodiment.

On the basis of these data and the program stored in the memory 10, the CPU 9 concretely specifies the expression (7) to operate the same with respect to all possible values $x_1, x_2, \ldots$ for $S_N$. Upon obtaining the results of the operation, the CPU 9 supplies writing signals to a read/write selection signal input pin R/W of the RAM 16 while generating N-bit address signals corresponding to respective values of the N-bit digital data $S_N$ through an address generator 8 to supply the same to the address part of the RAM 16. At the address of the RAM 16, corresponding M-bit data $S_M$ obtained by the CPU 9 based on the expression (7) is stored. This storage relation is similar to that shown in FIG. 4. Namely, stored are M-bit digital data $f(x_1), f(x_2), \ldots$ corresponding to the respective ones of $x_1, x_2, \ldots$, assuming that $f(S_N)$ represents the functional form in the right side of the expression (7).

Upon completion of the writing operation, the CPU 9 supplies reading signals to the RAM 16. When the original 1 is set to be read out through the photoelectric converter 3, N-bit digital signals after A-D conversion are supplied to the address part of the RAM 16, which in turn outputs the M-bit digital data corresponding to the N-bit values. Upon completion of such processing in respective scanning directions, image input operation is completed with respect to one original 1. When another original image in a different density range is to be subsequently read, the said values $D_{min}, D_{max}, S_{min}$ and $S_{max}$ are inputted anew to perform similar operation, storage and reading.

With respect to accuracy in this embodiment, when, for example, the linear relation specifying data are given as $D_{min}=0.2$, $D_{max}=0.8$, $S_{min}=0$ (0% in reduction to the area rate of halftone dots in case of a process scanner) and $S_{max}=255$ (100% in the same case) assuming that N=12 bits, M=8 bits and $D_0=2.7$, the image can be expressed in 230 gradation levels within the range of the area rate of halftone dots of 5% to 95%. Thus, the number of gradation levels is remarkably increased in comparison with 57 levels in the case of fixedly employing the linear relation $L_2$ as shown in FIG. 2. Therefore, it is understood that, in addition to improvement by transformation based on the linear relation, a further effect is obtained by varying the linear relation to perform transformation in consideration of the range of density distribution of the original image.

Similarly to the first embodiment, further, employment of the aforementioned look-up table memory enables high speed operation while the digital processing improves productivity and stability.

Modification

Description is hereafter made on modifications of the present invention.

(i) Although the functional form represented by the expression (3) is assumed for the output characteristics of the input/conversion section 5 with respect to the optical density in the respective embodiments, this functional form may not be directly applied when a photoelectric converter is inferior in linearity. In such case, a functional form representing the output characteristics of the input/conversion section 5 is set as $S_N=F(D)$ to obtain the form of an inverse function $F^{-1}$ of the function F(D), thereby to obtain relation $D=F^{-1}(S_N)$. Therefore, input/output relation in the digital data transformation means is set on the basis of the following expression:

$$S_M = k_1 F^{-1}(S_N) + k_2 \qquad (11)$$

where $k_1$, and $k_2$ are constants.

From these expressions, $S_M$ can be expressed as follows:

$$S_M = k_1 D + k_2 \qquad (12)$$

Thus, achieved is transformation for giving M-bit digital data indicating values in linear relation to the optical density D.

In case where the linear relation is varied as in the second embodiment, the values $k_1$ and $k_2$ are treated as variables and determined by the linear relation specifying data.

(ii) When the functional form corresponding to F(D) cannot be obtained by analytical expression, relation between D and $S_N$ may be numerically obtained through use of a gray scale etc. to store $S_M$ thus obtained in the memory 6 as shown in FIG. 1.

(iii) As to the system such as a facsimile for general public use, it may be required to be simple in operation while gradation reproducibility of reproduced images may not necessarily be high. In this case, the second embodiment can be carried out as follows:

The density ranges etc. of the images to be inputted are restricted to several types. Under the circumstances, linear relationships corresponding to the respective density ranges are derived and transformation data obtained therefrom are previously stored separately in a plurality of memories or different areas of a mass storage memory. Simple selection switches etc. may be used as the "transformation characteristic specifying means". In response to the selection by the selection switches, a memory receiving the N-bit digital signals is selected to output the M-bit digital data stored therein. In this case, the variable range of the linear relation is over the aforementioned several types. The term "variable" used in connection with the present invention includes such discrete variability as well as continuous variability.

(iv) The transformation formula represented by the expression (5) can be employed as a special case in the variable linear relation, because the aforementioned problems may be caused only when the same is fixedly employed.

In fact it is easily confirmed that the expression (7) becomes the expression (5) assuming that $D_{min}=0$ and $D_{max}=D_0$ in the expression (7), and hence it is understood that the expression (7) includes the expression (5).

Figure 9:
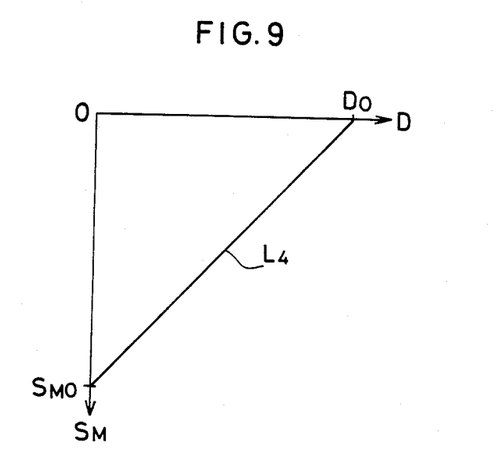
FIG. 9 is a graph showing a modification of a linear relation of the present invention.

Further, the data $D_{max}$ may be less than the data $D_{min}$ regardless of the ordinary meaning of subscripts "min" and "max". Assuming that, for example, $D_{max}=0$ and $D_{min}=D_0$, the expression (7) becomes the following expression (13) corresponding to linear relation as shown by $L_4$ in FIG. 9:

$$S_M = S_{M0} - \frac{S_{N0}}{D_0} \log \left\{ \frac{S_{N0}}{S_{N0} - S_N(1 - 10^{-D_0})} \right\} \quad (13)$$

When such relation is specified, negative/positive transformation is also performed in the image input system.

The present invention having the aforementioned characteristics is also applicable to an input system for television video signals, in addition to the facsimile and the process scanner. In the case of the process scanner, the gradation level can be changed through use of another look-up table after the M-bit digital signals are obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image input system for photoelectrically reading the image of an object and inputting the same thereby to supply signals expressing said image to an image processing system, said image input system comprising:
    photoelectric conversion means for photoelectrically reading said image to convert the same into electric analog signals;
    analog-to-digital converter means for converting said analog signals into N-bit digital signals; and
    digital data transformation means for transforming said N-bit digital signals into M-bit digital signals indicating values in prescribed linear relation to optical density of said image to output said M-bit digital signals to said image processing system,
    said N and M being integers satisfying N>M, wherein:
    said linear relation is valid within a range of $0 \leq D \leq D_o$, D being an optical density of said image and $D_o$ being the maximum value of reproducible optical density, and
    said digital data transformation means performs transformation on the basis of the following expression (a):

$$S_M = (S_{Mo}/D_o) \log \{S_{No}/(S_{No} - S_N(1 - 10^{-D_o}))\}$$

where
    $S_N$ represents values indicated by said N-bit digital signals,
    $S_M$ represents values to be indicated by said M-bit digital signals in correspondence to said values $S_N$,
    $S_{No}$ represents a value $S_N$ corresponding to said value $D_o$, and
    $S_{Mo}$ represents a value $S_M$ corresponding to said value $D_o$.

2. An image input device in accordance with claim 1, wherein said digital data transformation means is operable for transforming said N-bit digital signals to M-bit digital signals having a quantization error corresponding to substantially identical density errors independent of the optical density of the original.

3. An image input system in accordance with claim 1, wherein:
    said digital data transformation means includes memory means storing said values $S_M$ obtained on the basis of said expression (a) in respective addresses corresponding to said values $S_N$ as data respectively to output corresponding said values $S_M$ as said M-bit digital signals every time said N-bit digital signals are inputted.

4. An image input device in accordance with claim 1, further comprising specifying means for inputting linear relation specifying data for specifying a desired linear relationship between said M-bit digital signals and said optical density.

5. An image input device in accordance with claim 1, wherein said digital data transformation means is operable for reducing a number of bits required to be processed while maintaining a desired high level of accuracy in reproduction of gradation of image optical density.

6. An image input system for photoelectrically reading the image of an object and inputting the same thereby to supply signals expressing said image to an image processing system, said image input system comprising:
    photoelectric conversion means for photoelectrically reading said image to convert the same into electric analog signals;
    analog-to-digital converter means for converting said analog signals into N-bit digital signals;
    digital data transformation means for transforming said N-bit digital signals into M-bit digital signals indicating values in desired linear relation to optical density of said image to output said M-bit digital signals to said image processing system; and
    transformation characteristic specifying means for inputting linear relation specifying data for specifying said desired linear relation within variable relation thereby to supply transformation characteristics corresponding to said desired linear relation to said digital data transformation means,
    said N and M being integers satisfying N>M, wherein:
    said linear relation specifying data include two optical density values $D_{min}$ and $D_{max}$ indicating end points of the optical density range of said image and two values $S_{min}$ and $S_{max}$ indicating end points of a range of values to be indicated by said M-bit digital signals, and
    said digital data transformation means performs transformations on the basis of the following expression (b) determined by said values $D_{min}$, $D_{max}$, $S_{min}$ and $S_{max}$:

$$S_M = (1/\Delta D)(\Delta(SD) + \Delta S \log\{S_{No}/(S_{No} - S_N(1 - 10^{-D_o}))\}$$ where D represents the optical density of said image,
    $D_o$ represents the maximum value of reproducible optical density,
    $S_N$ represents values indicated by said N-bit digital signals,
    $S_M$ represents values to be indicated by said M-bit digital signals in correspondence to said values $S_N$,
    $S_{No}$ represents a value $S_N$ corresponding to said value $D_o$,
    $\Delta D = D_{max} - D_{min}$,
    $\Delta S = S_{max} - S_{min}$, and
    $\Delta(SD) = S_{min}D_{max} - S_{max}D_{min}$.

7. An image input system in accordance with claim 6, further including means for arbitrarily selecting said linear relation specifying data from continuous values.

8. An image input system in accordance with claim 6, further including means for arbitrarily selecting said linear relation specifying data from discrete values.

9. An image input device in accordance with claim 6, wherein;
said linear relation being connected to limit transformation or boost-up transformation in the vicinity of respective ones of maximum and minimum values of the optical density of said image.

10. An image input system in accordance with claim 6, wherein:
said transformation characteristic specifying means includes operational means for inputting data representing said values $D_{min}$, $D_{max}$, $S_{min}$, and $S_{max}$ to perform operation on the basis of said expression (b), and
said digital data transformation means includes memory means storing said values $S_M$ in respective addresses corresponding to said values $S_N$ as data on the basis of outputs from said operational means to output corresponding said values $S_M$ as said M-bit digital signals every time said N-bit digital signals are inputted as an address signal.

11. In an image input device for providing an imaging signal of an original to an image processing system, the improvement comprising:
digital means for providing a digital representation of an image of an original having a linear relationship to the optical density thereof,
said digital means comprising first storage means for converting an N-bit digital signal substantially proportional to light intensity detected by a photo detector from the original, the N-bit digital signal being an exponential function of the optical density of the original, to an M-bit digital signal substantially linearly related to said optical density of the original,
where N>M,
wherein said first storage means comprises RAM means,
said digital means further comprising varying means for varying the linear relationship between said digital representation and said optical density to improve resolution of images of an original having a limited optical density range.

12. An improved image input device as recited in claim 11, wherein said varying means is operable for varying the linear relationship in response to data inputted for specifying conversion characters at maximum and minimum values of the optical density between which the linear relationship is to hold.

13. An improved image input device as recited in claim 12 wherein said means for varying comprises input means for inputting end point data to identify minimum and maximum end points of said limited optical density range and of a corresponding range of said digital representation thereof, and
transforming means for obtaining a linear relationship between said limited optical density range and said range of said digital representation thereof,
said transforming means providing different ones of said linear relationships as different sets of M-bit data to said digital means.

14. An improved image input device as recited in claim 13 wherein said transforming means further comprises limit means for providing non linear relationships between said optical density and said digital representation thereof for optical density values outside said limited optical density range.

15. An improved image input device as recited in claim 13 wherein said transforming means comprises second storage means for storing a program,
keyboard means for input of a desired limited optical density range and a corresponding digital data range,
processing means connected to said second storage means and said keyboard means for obtaining a linear relationship between the input ranges,
said processing means providing a set of values representing the linear relationship obtained thereby to said first storage means for storage at predetermined addresses therein.

16. An improved image input device as recited in claim 15 wherein said transforming means further comprises address generating means responsive to said processing means for causing said first storage means to store said values at addresses generated thereby.

* * * * *